June 6, 1939.　　　　B. M. MARKS　　　　2,161,481

PROCESS OF POLYMERIZATION

Filed Sept. 1, 1937

Barnard M. Marks INVENTOR.

BY

J. M. Castle Jr.
ATTORNEY.

Patented June 6, 1939

2,161,481

UNITED STATES PATENT OFFICE 2,161,481

PROCESS OF POLYMERIZATION

Barnard M. Marks, Clifton, N. J., assignor to E. I. du Pont de Nemours & Company, Wilmington, Del., a corporation of Delaware Application September 1, 1937, Serial No. 161,913

9 Claims. (Cl. 260—32)

This invention relates to a process of polymerization and, more particularly, to a process of polymerizing a polymerizable organic liquid in emulsion form.

Heretofore, polymerizable organic liquids, as exemplified by methyl methacrylate and styrene, have been polymerized in the form of emulsions. The known processes for accomplishing this have been objectionable to a greater or lesser degree because of the tendency of the emulsions to break prematurely. As the proportion of polymerizable liquid in the emulsion is increased, the difficulty in preventing premature breaking of the emulsion becomes greater and such processes, in general, have not been feasible for polymerizing, at commercially economical rates, emulsions containing more than 50%, by weight thereof, of polymerizable liquid. This is an obvious disadvantage as the working of more concentrated emulsions would increase production of polymer per unit of equipment per day and, also, emulsions or, more correctly, dispersions of higher solids content possess definite technical advantages in various fields of use.

An object of the present invention is to provide an improved and more economical process of polymerizing polymerizable organic liquids in emulsion form. A further object is to provide such a process wherein the tendency of the emulsion to break or coagulate prematurely is reduced so that emulsions containing 50% or more of polymerizable liquid can be polymerized at a commercially feasible rate to give highly uniform emulsions of polymer. A still further object is to provide such a process in which uniform emulsions of polymer containing pigments and plasticizers may be produced. Other objects of the invention will be apparent from the description given hereinafter.

The above objects are accomplished according to the present invention by emulsifying a polymerizable organic liquid in a non-solvent vehicle and continuously passing said emulsions in a stream of restricted thickness and under conditions of turbulent flow through a zone of polymerizing influence whereby said organic liquid is converted to polymer. Preferably, the invention is carried out by passing the emulsion containing a polymerization catalyst continuously through a tube in sinuous form maintained at a temperature sufficiently high to effect polymerization of the organic liquid in the emulsion as it passes through the heated zone.

Figure 2:
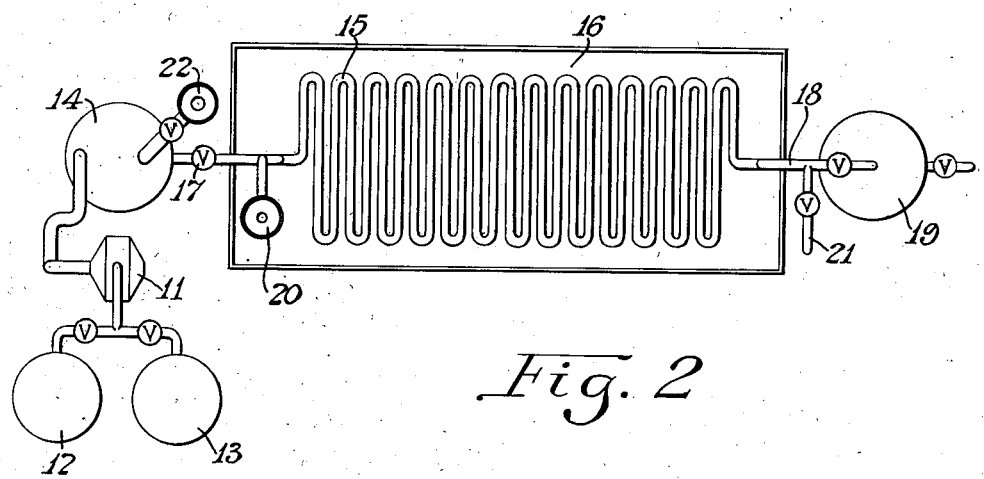
Figure 1:
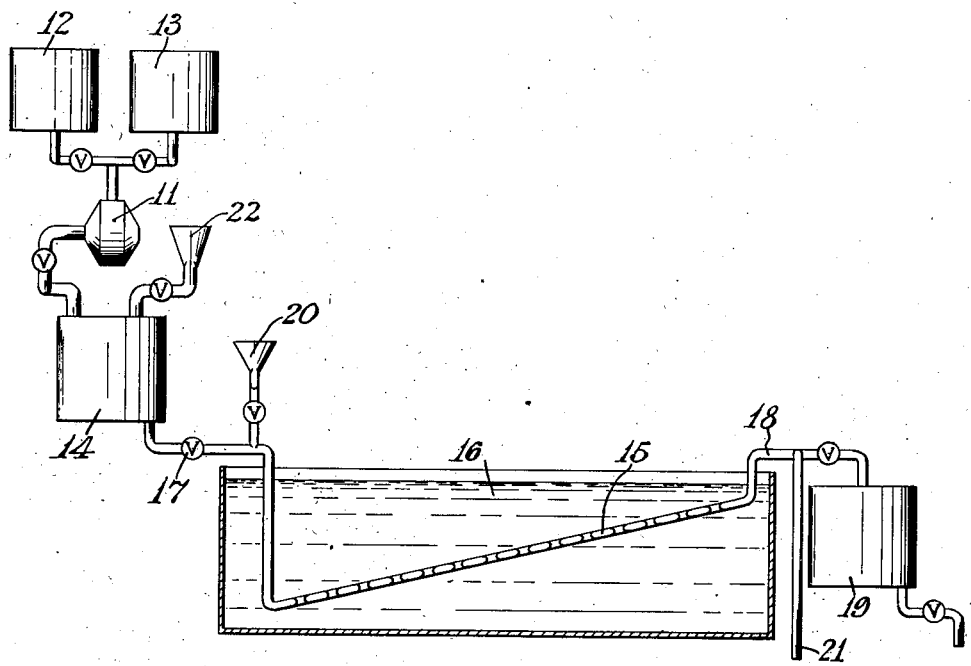

The process of the present invention will be described with reference to the accompanying drawing wherein:

Fig. 1 is a front elevation of an apparatus suitable for use in carrying out the invention; and Fig. 2 is a plan view of the same apparatus. Both figures are diagrammatic illustrations and like reference numerals designate like parts in the two figures.

The process is carried out by emulsifying the polymerizable organic liquid, preferably containing a polymerization catalyst, in a non-solvent vehicle such as water, containing an emulsifying agent, in the colloid mill 11 which is fed from tanks 12 and 13 containing, respectively, the polymerizable organic liquid and the aqueous vehicle. The emulsion formed in the colloid mill is drawn off into a storage vessel 14.

Connected with the storage vessel 14 is a sinuous reaction tube 15, the greater part of which is immersed in a water bath 16 provided with suitable heating means not shown in the drawing.

The opening of the valve 17 permits the emulsion to run from the storage vessel 14 into the sinuous tube 15. In the tube 15 the emulsion encounters a polymerizing temperature furnished by the heat of the water bath 16. The rate of introduction of the emulsion into the tube, the length of the tube, the catalyst content of the emulsion, and the temperature employed are adjusted so that the polymerization is complete before the emulsion reaches the discharge end of the tube 15 at 18 where the tube emerges from the bath and delivers the emulsion into the receiver 19. Despite the exothermicity of the polymerization reaction, local overheating of the emulsion during its passage through the tube 15 is avoided because the smallness of the diameter of the tube 15, together with the turbulence of the flow in the tube, due to the frequent changes of direction, effectively prevents the temperature from rising substantially above that of the water bath 16. The viscosity of the emulsions herein considered is low, not exceeding that of ordinary whipping cream, and thus there is nothing to prevent the rapid distribution and diffusion of heat and equalization of temperature.

Polymerization takes place smoothly and uniformly during the progress of the emulsion through the tube and there is no release of disemulsified monomer which would tend to attack and destroy the emulsion.

It is preferred that the reaction tube 15 be tilted upward somewhat over its intake to its discharge end to facilitate the removal of air which will be driven ahead of the column of emulsion as it progresses through the tube at the beginning of the process. An alternative means of expelling air from the tube 15 is to fill it initially with water, making use of the branch intake 20 shown in the drawing. As the process commences, with emulsion introduced into the tube, the water initially contained in the tube is expelled through the discharge end and may be discarded through the bleeder connection 21. Another alternative method of operation is to allow the reaction tube 15 to become rapidly filled with emulsion at the start of the process, and then, after the rate of feed of the emulsion has been established to insure completion of polymerization during passage of the emulsion through the tube 15, to segregate and re-work the portion of emulsion which initially filled the tube and which was not exposed to the polymerizing temperature for a sufficient time. This incompletely polymerized portion may be drawn off from the receiver 19, or through the bleeder 21, and returned to the emulsion storage vessel 14 through the second intake shown at 22.

The reaction tube 15 is made sinuous in form to induce turbulence of flow which promotes uniformity of the progress of polymerization of the emulsion. Usually, it will be convenient and economical to use commercial tubing or pipe of circular cross-section for the reaction conduit. However, the conduit may be in the form of a long shallow box-like structure with suitable provision, either by baffles or by sinuousity, for the development of turbulence of flow. The same effect may also be obtained by flowing the emulsion down an inclined sheet or trough, under suitable polymerizing influence, but such an apparatus would involve the problem of preventing contamination and the volatilization of monomer. In so far as the principle of the invention is concerned, it is independent of any particular apparatus employed and depends upon passing the emulsion continuously through a zone of polymerizing influence in a body of restricted thickness and in a condition of turbulent flow.

Whereas on a laboratory scale the prevention of local overheating could largely be accomplished without creating turbulent flow of the emulsion, it is essential, on a commercial scale, where it is feasible to use tubes of diameters from ½″ to 2″, to create turbulence of flow in order to ensure the maintenance of uniformity of temperature. This turbulence of flow may be achieved in a straight tube by increasing the rate of flow beyond a critical value (Bingham "Fluidity and Plasticity", 1922, page 4) but, to operate at moderate rates of flow, it is preferable to bring about turbulence by interposing obstacles in the line of flow of the emulsion.

The reaction tube 15 may be made of a variety of materials including glass and metals; "K A 2S" steel, a corrosive resistant ferrous alloy of the nominal chemical composition: carbon, 0.07%; chromium, 18.5%; nickel, 8.5%, remainder, iron, one of the so-called 18–8 Cr.-Ni. alloys (43 Chem. & Met. Engineering Journal 544) made by numerous companies, has been found satisfactory for the purpose. The material of which the tube is made must be selected with reference to the chemical character of the emulsion in order to avoid objectionable corrosion.

The following examples, wherein parts are given by weight, illustrate specific embodiments of the invention:

*Example I*

The following materials are used:

| | Parts |
|---|---|
| Methyl methacrylate monomer | 1200 |
| Water | 800 |
| Sodium lauryl sulphate | 15 |
| Benzoyl peroxide | 1.2 |
| Hydrogen peroxide (30% strength) | 33 |

The benzoyl peroxide and the hydrogen peroxide serves as polymerization catalysts while the sodium lauryl sulphate serves as the emulsifying agent. The benzoyl peroxide is dissolved in the monomeric methyl methacrylate and the sodium lauryl sulphate is dissolved in the water. To the water is then added the hydrogen peroxide.

The two solutions are then mixed together and passed through a colloid mill and then continuously through the apparatus already described. The reaction tube has a diameter of 1″ and a total effective length of 200 feet immersed in a water bath maintained at a temperature of 82° C. The emulsion is flowed through this reaction tube at the rate of about 0.18 gallons per minute so that it is exposed to the reaction temperature for about 45 minutes.

The polymerized emulsion recovered at the end of the reaction tube contains no appreciable residue of unpolymerized monomer. It is uniformly fine-grained and has a solids content of approximately 60%, i. e., 1.5 parts of polymer to 1 part of aqueous vehicle.

The above procedure was carried out using the same materials but with the addition of 12 parts of stearic acid which is added to the monomeric methyl methacrylate. The finished emulsion of polymer resembles that obtained above in fineness and uniformity. The stearic acid has the function of a lubricant in the subsequent use of the polymer.

*Example II*

The following materials are used:

| | Parts |
|---|---|
| Monomeric methyl methacrylate | 1200 |
| Water | 600 |
| Sodium lauryl sulphate | 12 |
| Benzoyl peroxide | 12 |

The procedure is carried out as in Example I, a uniform emulsion being obtained having a solids content of approximately 66%.

*Example III*

The following materials are used:

| | Parts |
|---|---|
| Monomeric methyl methacrylate | 900 |
| Water | 900 |
| Diamyl phthalate | 90 |
| Acetyl benzoyl peroxide | 7 |
| Turkey red oil | 18 |

The plasticizer, diamyl phthalate, is mixed with the monomer at the start and the procedure, thereafter, is as in Example I.

*Example IV*

The following materials are used:

| | Parts |
|---|---|
| Monomeric styrene | 100 |
| Water | 80 |
| Sodium lauryl sulphate | 1 |
| Benzoyl peroxide | 1 |

The benzoyl peroxide is dissolved in the monomeric styrene and the solution filtered. The emulsifying agent is dissolved in water and this solution is likewise filtered. The emulsion is then formed in the manner described in Example I and is then subjected to polymerization by being passed through a reaction tube as in Example I. The temperature of the water bath is maintained at 90° C. and the time allowed for polymerization 80 minutes.

Example V

The following materials are used:

| | Parts |
|---|---|
| Isobutyl methacrylate monomer | 1000 |
| Water | 1000 |
| Dimethoxy ethyl phthalate | 400 |
| Sodium lauryl sulphate | 19 |
| Benzoyl peroxide | 10 |

The procedure is similar to that in Example I except that a temperature of 86° C. is employed and the time allowed for polymerization is 90 minutes.

Example VI

The following materials are used:

| | Parts |
|---|---|
| Normal butyl methacrylate monomer | 1000 |
| Water | 800 |
| Sodium lauryl sulphate | 17 |
| Benzoyl peroxide | 10 |

The procedure is as in Example I except that the temperature of the water bath is 72° C. and 120 minutes is allowed for polymerization.

Example VII

The following materials are used:

| | Parts |
|---|---|
| Monomeric methyl methacrylate | 1000 |
| Alpha-toluido anthraquinone | 1 |
| Water | 700 |
| Sodium lauryl sulphate | 10 |
| Benzoyl peroxide | 10 |

The dyestuff, alpha-toluido anthraquinone, is first dissolved in the monomer and the procedure thereafter is carried out as in Example I.

Instead of using a straight monomer, a syrup of partially polymerized material may be employed. This syrup, in order to avoid difficulties in emulsification, should not exceed the viscosity of glycerin and, in the case of methyl methacrylate, would contain not more than about 1 or 2% polymer. The syrup may be prepared either by subjecting the monomer to heat until the desired degree of polymerization has developed or by dissolving previously prepared polymer in monomer. The use of such a syrup effects a saving in time in the polymerization process. Also, it is useful in making pigmented emulsions because the necessary dispersion of the pigment may be effected by grinding same with a dough of polymer in a suitable solvent. The following example illustrates this procedure:

Example VIII

The following materials are used:

| | | Parts |
|---|---|---|
| "Ti Bar" pigment | parts | 225 |
| Polymeric methyl methacrylate | do | 50 |
| Methyl acetate | q. s. | |
| Monomeric methyl methacrylate | parts | 1450 |
| Dimethoxy ethyl phthalate | do | 600 |
| Sodium lauryl sulphate | do | 22.5 |
| Water | do | 1500 |
| Benzoyl peroxide | do | 15 |

The pigment which is approximately 25% titanium dioxide and 75% barium sulfate and marketed by Krebs Pigment and Color Corporation is ground in a dough of polymeric methyl methacrylate and methyl acetate. This dough, when it has been worked sufficiently to effect complete dispersion of the pigment, is drawn out into a thin sheet and allowed to season until substantially all of the methyl acetate solvent has been eliminated. It is then dissolved in the monomeric methyl methacrylate. To the monomer is also added the dimethoxy ethyl phthalate and the benzoyl peroxide. The emulsifying agent is dissolved in water and the emulsion formed as in Example I. Polymerization is effected by passing the emulsion through a tube of 2" diameter at a rate of 0.68 gallons per minute, the tube having an effective heated length of 250 feet. A temperature of 80° C. is maintained by the use of a water bath and the time allowed for polymerization is thus 60 minutes.

The resulting emulsion of pigmented, plasticized, polymerized methyl methacrylate has a solids content, including plasticizer and pigment, of about 61%.

The following examples illustrate other methods of incorporating pigments:

Example IX

The following materials are used:

| | Parts |
|---|---|
| Monomeric methyl methacrylate | 1500 |
| Titanium oxide pigment ball milled to extreme fineness | 70 |
| Diamyl phthalate | 600 |
| Water | 1200 |
| Sodium lauryl sulphate | 22.5 |
| Benzoyl peroxide | 15 |

The titanium oxide, which serves as a white pigment, is thoroughly ground with a portion of the diamyl phthalate, which serves as a plasticizer, until the pigment particles are thoroughly dispersed. The resulting paste, together with the rest of the diamyl phthalate and the benzoyl peroxide, are added to the monomeric methyl methacrylate. The emulsion is then formed and the polymerization carried out as in Example I.

The resulting emulsion of polymeric methyl methacrylate is uniformly pigmented by the titanium dioxide. The solids content of the finished polymerized emulsion (the plasticizer being associated with the polymeric ester and, therefore, counted as a solid) is approximately 64%.

Example X

The following materials are used:

| | Parts |
|---|---|
| Monomeric methyl methacrylate | 2000 |
| Water | 1500 |
| Polymethacrylic acid | 30 |
| Sodium hexametaphosphate | 2 |
| Benzoyl peroxide | 20 |
| "Ti Bar" pigment | 20 |

The benzoyl peroxide catalyst is dissolved in the monomeric methyl methacrylate. The polymethacrylic acid and the sodium hexametaphosphate are dissolved in the water and the pigment added to this solution. The sodium hexametaphosphate serves to disperse the pigment and apparently assists also in the emulsion of the monomer which is accomplished primarily by the polymethacrylic acid. Formation of the emulsion and polymerization is carried out as in Example I.

The following example illustrates the application of pressure to the process of the present invention:

Example XI

The materials of Example I, prepared and mixed as in that example to form an emulsion, are passed through a sinuous reaction tube under a pressure of 5 pounds per square inch. The tube has a diameter of 2" and an effective heated length of 250 feet which is immersed in a bath of water at 88° C. The rate of feed is 1.07 gallons of emulsion per minute, giving a reaction time of 38 minutes which suffices to carry the polymerization to substantial completion.

The advantage of the use of pressure, as in this example, is that it prevents volatilization and thus permits the use of a higher temperature. The pressure may be furnished in an apparatus such as shown in the drawing by placing a suitable pump in the circuit before the reaction tube 15 enters the water bath 16.

It will be understood that the above examples are merely illustrative and that the invention is applicable, in general, to polymerizable organic liquids and, particularly, to styrene, alpha methyl styrene, and esters and nitriles of acrylic and methacrylic acids. Among such esters may be mentioned:

| | |
|---|---|
| Methyl methacrylate | Para cyclohexyl phenyl methacrylate |
| Ethyl methacrylate | |
| Butyl methacrylate | Decahydro - beta - naphthol methacrylate |
| Isobutyl methacrylate | |
| Secondary butyl methacrylate | Di-isopropyl carbinol methacrylate |
| Tertiary amyl methacrylate | Furfuryl methacrylate |
| Phenyl methacrylate | Tetrahydro furfuryl methacrylate |
| Glycol monomethacrylate | |
| Glycol dimethacrylate | Methyl acrylate |
| Cyclohexyl methacrylate | Ethyl acrylate |
| | Butyl acrylate |

The invention is likewise applicable to the formation of interpolymers by employing a mixture of two or more monomeric substances.

As the examples show, coloring matter, either soluble or insoluble, plasticizers, and the like, may be mixed in the liquid to be polymerized. Coloring matter soluble in the monomeric liquid to be polymerized is the most convenient to use but insoluble pigments may be used provided they are properly dispersed in the monomer.

Plasticizers may be mixed with the polymerizable liquid, prior to its emulsion. It should be noted that the presence of plasticizer, even in proportions as high as 50 parts plasticizer per 100 parts of polymerizable liquid, does not interfere with the operation of the process.

Among the substances satisfactory for use as emulsifying agents in the present invention may be mentioned the sodium salts of higher fatty alcohol sulphates (known commercially as "Avirols"), sodium salts of higher fatty sulphate esters (known commercially as "Duponols" and "Gardinols"), polymethacrylic acid, sodium polymethacrylate, and Turkey red oil. The emulsifying agent should be completely dissolved in the aqueous vehicle before it is used.

The monomeric substance to be polymerized may be emulsified in any non-solvent vehicle but, since water is highly satisfactory for the purpose and most economical, there is little inducement to use other types of non-solvent vehicles as various organic liquids.

The polymerization catalysts heretofore used in the known batch processes of polymerization are adapted for use in the process of the present invention. Such catalysts include benzoyl peroxide, acetyl peroxide, acetyl benzoyl peroxide, and mixtures of benzoyl peroxide and hydrogen peroxide.

The amount of catalyst will be selected in view of the various factors involved, including activity of the particular catalyst, the temperature to be employed, and the speed of polymerization desired, as those skilled in the art will appreciate.

Except in the case of hydrogen peroxide, the catalyst is preferably dissolved in the monomer prior to emulsification. Hydrogen peroxide is preferably added to the aqueous vehicle prior to emulsification.

The temperature employed will normally be high enough to effect polymerization at an economical speed but not so high as to cause ebullition; thus, with methyl methacrylate, a temperature between 70° C. and 82° C., at atmospheric pressure, would ordinarily be employed. Where the reaction is carried out under pressure, higher temperatures can be employed without causing ebullition.

An advantage of the present invention is that it provides a practical and commercial method of continuously making emulsions of polymers in which the content of polymer is substantially in excess of the greatest which has heretofore been feasible. The lower non-solvent vehicle content of such emulsions is of benefit with many of their uses, particularly through reducing the cost of transportation and drying. A further advantage of the invention is that it provides a more uniform polymerization than heretofore attainable and is applicable to the production of emulsions of highly plasticized polymers. Further, the process does not give rise to losing the monomer by vaporization during the polymerization.

As many apparently widely different embodiments of this invention may be made without departing from the spirit and scope thereof, it is to be understood that the invention is not limited to the specific embodiment thereof except as defined in the appended claims.

I claim:

1. Process of preparing a dispersion of a polymerized organic compound in a liquid vehicle which comprises emulsifying a polymerizable organic liquid in a non-solvent liquid vehicle, and continuously flowing said emulsion through a heated tube for a period of time sufficient to convert said polymerizable liquid to polymer, said emulsion being kept constantly in a state of agitation throughout the period said polymerizable liquid is undergoing polymerization by maintaining the flow of said emulsion at a rate sufficient to insure a state of turbulent flow.

2. Process of preparing a dispersion of a polymerized organic compound in a liquid vehicle which comprises emulsifying a polymerizable organic liquid in a non-solvent liquid vehicle, and continuously flowing said emulsion through a heated tube in sinuous form for a period of time sufficient to convert said polymerizable liquid to polymer, said emusion being kept constantly in a state of agitation throughout the period said polymerizable liquid is undergoing polymerization by maintaining the flow of said emulsion at a rate sufficient to insure a state of turbulent flow.

3. Process of preparing a dispersion of a polymerized organic compound in an aqueous vehicle which comprises emulsifying a polymerizable organic liquid in an aqueous vehicle, and continuously flowing said emulsion through a heated tube for a period of time sufficient to convert said polymerizable liquid to polymer, said emusion being kept constantly in a state of agitation throughout the period said polymerizable liquid is undergoing polymerization by maintaining the flow of said emulsion at a rate sufficient to insure a state of turbulent flow.

4. Process of preparing a dispersion of a polymerized organic compound in an aqueous vehicle which comprises emulsifying a polymerizable organic liquid in an aqueous vehicle, and continuously flowing said emulsion through a heated tube in sinuous form for a period of time sufficient to convert said polymerizable liquid to polymer, said emulsion being kept constantly in a state of agitation throughout the period said polymerizable liquid is undergoing polymerization by maintaining the flow of said emulsion at a rate sufficient to insure a state of turbulent flow.

5. Process of preparing a dispersion of a polymerized organic compound in an aqueous vehicle which comprises emulsifying a polymerizable organic liquid in an aqueous vehicle, and continuously flowing said emulsion through a heated tube having a diameter of ½" to 2" in sinuous form for a period of time sufficient to convert said polymerizable liquid to polymer, said emulsion being kept constantly in a state of agitation throughout the period said polymerizable liquid is undergoing polymerization by maintaining the flow of said emulsion at a rate sufficient to insure a state of turbulent flow.

6. Process of preparing a dispersion of a polymerized organic compound in an aqueous vehicle which comprises emulsifying a polymerizable organic compound in a non-solvent liquid vehicle, said vehicle being less than 50% by weight, of the emulsion formed, and contiuously flowing said emulsion through a heated tube for a period of time sufficient to convert said polymerizable liquid to polymer, said emulsion being kept constantly in a state of agitation throughout the period said polymerizable liquid is undergoing polymerization by maintaining the flow of said emulsion at a rate sufficient to insure a state of turbulent flow.

7. Process of preparing a dispersion of polymerized methyl methacrylate in a liquid vehicle which comprises emulsifying monomeric methyl methacrylate in a non-solvent liquid vehicle, and contiuously flowing said emulsion through a heated tube for a period of time sufficient to convert said monomercic methyl methacrylate to polymer, said emulsion being kept constantly in a state of agitation throughout the period said methyl mehacrylate is undergoing polymerization by maintaining the flow of said emulsion at a rate sufficient to insure a state of turbulent flow.

8. Process of preparing a dispersion of polymerized methyl methacrylate in an aqueous vehicle which comprises emulsifying monomeric methyl methacrylate in an aqueous vehicle, and contiuously flowing said emulsion through a heated tube in sinuous form for a period of time sufficient to convert said monomeric methyl methacrylate to polymer, said emulsion being kept constantly in a state of agitation throughout the period said methyl methacrylate is undergoing polymerization by maintaining the flow of said emulsion at a rate sufficient to insure a state of turbulent flow.

9. Process of preparing a dispersion of polymerized methyl methacrylate in an aqueous vehicle which comprises emulsifying monomeric methyl methacrylate in an aqueous vehicle, said aqueous vehicle being less than 50%, by weight, of the emulsion formed, and continuously flowing said emulsion through a tube having a diameter of ½" to 2", said tube being in sinuous form and heated to 70–82° C. for a period of time sufficient to convert said monomeric methyl methacrylate to polymer, said emulsion being kept constantly in a state of agitation throughout the period the methyl methacrylate is undergoing polymerization by maintaining the flow of said emulsion at a rate sufficient to insure a state of turbulent flow.

BARNARD M. MARKS.